US009510333B2

(12) United States Patent
Wang et al.

(10) Patent No.: US 9,510,333 B2
(45) Date of Patent: *Nov. 29, 2016

(54) METHOD FOR RESOURCE ALLOCATION, METHOD FOR CHANNEL STATE INFORMATION TRANSMISSION, BASE STATION AND USER EQUIPMENT

(71) Applicant: FUJITSU LIMITED, Kawasaki-shi, Kanagawa (JP)

(72) Inventors: Yi Wang, Beijing (CN); Hua Zhou, Beijing (CN); Jianming Wu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/833,582

(22) Filed: Aug. 24, 2015

(65) Prior Publication Data
US 2015/0365935 A1 Dec. 17, 2015

Related U.S. Application Data

(63) Continuation of application No. 13/922,690, filed on Jun. 20, 2013, now Pat. No. 9,155,074, which is a continuation of application No. PCT/CN2010/080111, filed on Dec. 22, 2010.

(51) Int. Cl.
*H04W 72/04* (2009.01)
*H04L 5/00* (2006.01)
(Continued)

(52) U.S. Cl.
CPC ........ *H04W 72/0413* (2013.01); *H04L 1/0027* (2013.01); *H04L 1/1671* (2013.01); *H04L 5/001* (2013.01); *H04L 5/0053* (2013.01); *H04L 5/0057* (2013.01); *H04W 72/04* (2013.01)

(58) Field of Classification Search
None
See application file for complete search history.

(56) References Cited

U.S. PATENT DOCUMENTS 8,867,472 B2 * 10/2014 Lunttila ................ H04L 1/0027
370/329
2009/0097447 A1 4/2009 Han et al.
(Continued)

FOREIGN PATENT DOCUMENTS

CN 101808409 8/2010
CN 101808409 A 8/2010
(Continued)

OTHER PUBLICATIONS

International Preliminary Report on Patentability with Written Opinion of the International Searching Authority for corresponding International Patent Application No. PCT/CN2010/080111 mailed on Jun. 25, 2013.
(Continued)

*Primary Examiner* — Hong Cho
(74) *Attorney, Agent, or Firm* — Myers Wolin, LLC

(57) ABSTRACT

A method for resource allocation, method for channel state information transmission, base station and user equipment. Wherein the method for resource allocation includes: determining, by a base station, that it is necessary for a UE to report aperiodic CSI of relevant downlink CCs; and allocating, by the base station, corresponding resources to the UE according to the number of the relevant downlink CCs. The base station allocates corresponding resources to the UE in accordance with the number of relevant downlink CCs, resource allocation is flexible, and the transmission of UCI in case of multiple carriers is supported.

9 Claims, 8 Drawing Sheets

(51) Int. Cl.
*H04L 1/00* (2006.01)
*H04L 1/16* (2006.01)

(56) References Cited

U.S. PATENT DOCUMENTS

| | | | | |
|---|---|---|---|---|
| 2010/0315968 | A1* | 12/2010 | Zhou | H04L 1/0009 370/252 |
| 2011/0085513 | A1* | 4/2011 | Chen | H04W 72/042 370/330 |
| 2011/0122825 | A1* | 5/2011 | Lee | H04J 11/0069 370/328 |
| 2011/0136495 | A1* | 6/2011 | Chen | H04L 5/001 455/450 |
| 2011/0268071 | A1* | 11/2011 | Siew | H04L 1/0003 370/329 |
| 2011/0299467 | A1* | 12/2011 | Kim | H04L 5/0057 370/328 |
| 2011/0300854 | A1* | 12/2011 | Shan | H04L 1/1887 455/422.1 |
| 2011/0310759 | A1* | 12/2011 | Gerstenberger | H04L 5/001 370/252 |
| 2012/0039199 | A1* | 2/2012 | Chen | H04L 1/0027 370/252 |
| 2012/0106450 | A1* | 5/2012 | Golitschek Edler Von Elbwart | H04L 1/003 370/328 |
| 2012/0127869 | A1* | 5/2012 | Yin | H04L 1/0031 370/252 |
| 2012/0147831 | A1* | 6/2012 | Golitschek | H04L 1/0026 370/329 |
| 2013/0039327 | A1* | 2/2013 | Gao | H04L 1/0026 370/329 |
| 2013/0182674 | A1* | 7/2013 | Lunttila | H04L 5/001 370/329 |
| 2013/0258986 | A1* | 10/2013 | Seo | H04L 1/0026 370/329 |

FOREIGN PATENT DOCUMENTS

| | | |
|---|---|---|
| CN | 101917259 | 12/2010 |
| CN | 101917259 A | 12/2010 |
| CN | 101917260 | 12/2010 |
| CN | 101917260 A | 12/2010 |
| EP | 1 973 248 A2 | 9/2008 |
| EP | 2 097 990 B1 | 6/2010 |
| WO | 2006/116102 A2 | 11/2006 |
| WO | 2009/035297 A2 | 3/2009 |
| WO | 2010/036177 | 4/2010 |
| WO | 2010/036177 A1 | 4/2010 |
| WO | 2010/104290 A2 | 9/2010 |
| WO | 2010/144729 A2 | 12/2010 |

OTHER PUBLICATIONS

International Search Report issued for corresponding International Patent Application No. PCT/CN2010/080111, mailed Sep. 15, 2011, with an English translation.
International search report issued for corresponding International Patent Application No. PCT/CN2010/080111, mailed Sep. 15, 2011, with English translation.
Taiwanese Office Action issued for corresponding Taiwanese Patent Application No. 100146178, dated Dec. 17, 2013, with a partial English translation.
Office Action issued for corresponding Mexican Patent Application No. MX/a/2013/007300, dated Jun. 19, 2014, with an English translation.
Office Action for corresponding Canadian Patent Application No. 2,824,653 dated Jun. 2, 2014.
Office Action issued for corresponding Russian Patent Application No. 2013133826 dated Sep. 2, 2014 with an English translation.
Patent Examination Report No. 1 issued for corresponding Australian Patent Application No. 2010366219, dated Sep. 25, 2014.
Notice of Reason for Rejection issued for corresponding Japanese Patent Application No. 2013-545000, mailed on Mar. 3, 2015, with an English translation.
Huawei, "Remaining issues in aperiodic CQI-only PUSCH", Agenda Item: 6.2.3, 3GPP TSG RAN WG1 Meeting #63bis, R1-110015, Dublin, Ireland, Jan. 17-21, 2011.
Fujitsu, "RB restriction for CQI-only transmission on PUSCH in CA", Agenda Item: 6.2.3, 3GPP TSG-RAN1 Meeting #63b, R1-110501, Dublin, Ireland, Jan. 17-21, 2011.
Notice of Preliminary Rejection issued for corresponding Korean Patent Application No. 10-2013-7019212 mailed on Jan. 21, 2015 with an English translation.
Office Action issued by the Canadian Intellectual Property Office for corresponding Canadian Patent Application No. 2,824,653, dated May 21, 2015.
Extended European search report with supplementary European search report and the European search opinion issued by the European Patent Office for corresponding European Patent Application No. 10861134.4, mailed on Oct. 26, 2016.

\* cited by examiner

METHOD FOR RESOURCE ALLOCATION, METHOD FOR CHANNEL STATE INFORMATION TRANSMISSION, BASE STATION AND USER EQUIPMENT

CROSS-REFERENCE TO RELATED APPLICATION

The present application is a continuation application of the U.S. patent application Ser. No. 13/922,690, filed Jun. 20, 2013, now pending, which is a continuation of PCT/CN2010/080111, filed Dec. 22, 2010, the entire contents of each are wholly incorporated by reference.

TECHNICAL FIELD

The present invention relates to the field of wireless communication, and in particular to a method for resource allocation, method for channel state information transmission, base station and user equipment.

BACKGROUND ART

In a long-term evolution (LTE) system, a user equipment (UE) obtains channel state information (CSI) in downlink by measuring a downlink reference signal, and reports to a base station via an uplink, the CSI comprising a channel quality indicator (CQI) of the downlink, and also information of precoding matrix indicator (PMI) and rank indication (RI) for some downlink transmission mode. The above CSI, as well as ACK/NACK information and scheduling request (SR), are collectively referred to as uplink control information (UCI). The UCI may contain one piece of the above information only, or more pieces of the above information. The base station selects typical modulation and coding scheme, multi-antenna processing and hybrid automatic repeat request (HARM) on the basis of the UCI reported by the UE, and adaptively adjusts data transmission dynamically.

Currently, the CSI in the UCI may be reported periodically and aperiodically. Here, for the sake of convenience, the CSI reported periodically is referred to as periodic CSI, and the CSI reported aperiodically is referred to as aperiodic CSI. Generally, UCI containing periodic CSI is transmitted on a physical uplink control channel (PUCCH), and UCI containing aperiodic CSI is transmitted on a physical uplink shared channel (PUSCH), which may be multiplexed with uplink data (such as UL-SCH (uplink shared channel) data), and may also be transmitted separately on a PUSCH when there is no uplink data.

When it is necessary for a UE to report aperiodic CSI, the following manner may be used: when a base station requires a user equipment to report aperiodic CSI, the base station transmits downlink control information (DCI) to the UE, so as to instruct the UE to report aperiodic CSI and allocate corresponding PUSCH resources used for reporting the aperiodic CSI to the UE; when the UE receives the DCI, it reports aperiodic CSI by using the resources instructed in the DCI, and has the CSI contained in the UCI and transmitted to the base station via the PUSCH.

In an LTE system, one bit in a DCI format 0 is used to trigger a UE to report aperiodic CSI. In an advanced long-term evolution (LTE-A) system, since the system may support the transmission of multiple component carriers (CCs), and may support at most five CCs at present, so, in order to instruct a UE to report UCIs of multiple downlink CCs flexibly, two bits in DCI format 0/DCI format 4 are used to trigger a UE to report aperiodic CSI, and the UE is indicated to report the indices and the number of the corresponding downlink CCs.

In the implementation of certain embodiments, this applicant found that following defects exist in the prior art:

In an LTE system, each UE is configured with only one pair of uplink and downlink CCs. When the UE transmits UCI containing aperiodic CSI on a PUSCH with no data, a base station allocates four resource blocks (RBs) to the UE at most, and ensures the correct receiving of the UCI containing aperiodic CSI by using a reasonable channel encoding rate.

However, in an LTE-A system, with the number of CCs increases, the length of the UCI also increases. If the base station allocates four RBs to the UE at most, the resources allocated by the base station to the UE for transmitting the UCI containing aperiodic CSI are possibly insufficient. Hence, the correct receiving of the UCI by the base station cannot be ensured, and limitation of the scheduling of the data transmission by the base station is increased. No solution has been found till now to overcome the above defects.

It should be noted that the above description of the background art is merely provided for clear and complete explanation of certain embodiments herein and for easy understanding by those skilled in the art. And it should not be understood that the above technical solution is known to those skilled in the art as it is described in the background art.

SUMMARY

The embodiments provide a method for resource allocation, method for CDI transmission, base station and UE. The base station may allocate resources according to the number of relevant downlink CCs to which the aperiodic CSI needing to be reported by the UE corresponds, such that the manner of resource allocation is flexible, and supports the transmission of UCI containing aperiodic CSI in case of multiple carriers, thereby efficiently improving the probability of correct receiving of the UCI and reducing the limitation of the scheduling of the data transmission.

An aspect according to certain embodiments provides a method for resource allocation, includes:

determining, by a base station, that a UE should report aperiodic CSI of relevant downlink CCs; and allocating, by the base station, corresponding resources to the UE according to the number of the relevant downlink CCs.

Another aspect according to certain embodiments provides a base station, including:

a first determining unit for determining that a UE should report aperiodic CSI of relevant downlink CCs; and a resource allocating unit for allocating corresponding resources to the UE according to the number of the relevant downlink CCs.

A still another aspect according to certain embodiments provides a transmission method for UCI, comprising:

generating by a base station downlink control information, the downlink control information comprising triggering information which indicates a UE whether to report aperiodic CSI of relevant downlink CCs and indicates the indices and number of the relevant downlink CCs when reporting the aperiodic CSI of the relevant downlink CCs, the index of modulation and coding scheme, and used resources; wherein the used resources are resources allocated to the UE by the base station according to the number of the relevant downlink CCs; and transmitting the downlink control information to the UE by the base station, so that the UE transmits the aperiodic CSI according to the triggering information, the index of modulation and coding scheme and the used resources.

Still another aspect according to certain embodiments provides a transmission method for CSI, including:

receiving, by UE, downlink control information transmitted by a base station, the downlink control information comprising triggering information which indicates the UE whether to report aperiodic CSI of relevant downlink CCs and indicates the indices and number of the relevant downlink CCs when reporting the aperiodic CSI of the relevant downlink CCs, the index of modulation and coding scheme, and used resources; wherein the used resources are resources allocated to the UE by the base station according to the number of the relevant downlink CCs; and transmitting by the UE the aperiodic CSI according to the triggering information, the index of modulation and coding scheme and the used resources contained in the downlink control information.

Still another aspect according to certain embodiments provides a base station, including:

an information generating unit for generating downlink control information, the downlink control information comprising triggering information which indicates UE whether to report aperiodic CSI of relevant downlink CCs and indicates the indices and number of the relevant downlink CCs when reporting the aperiodic CSI of the relevant downlink CCs, an index of modulation and coding scheme, and used resources; wherein the used resources are resources allocated to the UE by the base station according to the number of the relevant downlink CCs; and a first information transmitting unit for transmitting the downlink control information to the UE, so that the UE transmits the aperiodic CSI according to the triggering information, the index of modulation and coding scheme, and the used resources contained in the downlink control information.

Still another aspect according to certain embodiments provides a UE, comprising:

an information receiving unit for receiving downlink control information transmitted by a base station, the downlink control information comprising triggering information which indicates the UE whether to report aperiodic CSI of relevant downlink CCs and indicates the indices and number of the relevant downlink CCs when reporting the aperiodic CSI of the relevant downlink CCs, an index of modulation and coding scheme, and used resources; wherein the used resources are resources allocated to the UE by the base station according to the number of the relevant downlink CCs; and a second information transmitting unit for transmitting the aperiodic CSI according to the triggering information, the index of modulation and coding scheme and the used resources contained in the downlink control information.

A further still another aspect according to certain embodiments provides a storage medium in which a computer-readable program is stored, wherein the computer-readable program enables the computer to carry out the method for allocating resources as described above in a base station.

A further still another aspect according to certain embodiments provides a computer-readable program, wherein when the program is executed in a base station, the program enables the computer to carry out the transmission method for CSI as described above in the base station.

A further still another aspect according to certain embodiments provides a storage medium in which a computer-readable program is stored, wherein the computer-readable program enables the computer to carry out the transmission method for CSI as described above in a base station.

A further still another aspect according to certain embodiments provides a computer-readable program, wherein when the program is executed in UE, the program enables the computer to carry out the transmission method for CSI as described above in the UE.

A further still another aspect according to certain embodiments provides a storage medium in which a computer-readable program is stored, wherein the computer-readable program enables the computer to carry out the transmission method for CSI as described above in UE.

The advantages of certain embodiments exist in that the base station may allocate resources according to the number of relevant downlink CCs to which the aperiodic CSI needing to be reported by the UE corresponds, such that the manner of resource allocation is flexible, and supports the transmission of UCI containing aperiodic CSI in case of multiple carriers, thereby efficiently improving the probability of correct receiving of the UCI and reducing the limitation of the scheduling of the data transmission.

With reference to the following description and drawings, certain embodiments are disclosed in detail, and the principles and the manners of use are indicated. It should be understood that the scope of the embodiments is not limited thereto. The embodiments contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

The above and other objects, features and advantages of the embodiments will become more obvious from the following description with reference to the drawings. In the drawings.

DETAILED DESCRIPTION

The embodiments are described as follows with reference to the drawings. These embodiments are illustrative only and are not intended to limit the present invention. For easy understanding of certain principles and embodiments by those skilled in the art, the embodiments are described taking an LTE-A system with a bandwidth of 10 MHz as an example. However, it should be understood that certain embodiments are not limited to the above system and is applicable to other systems related to aperiodic CSI transmission of multiple carriers.

Figure 1:
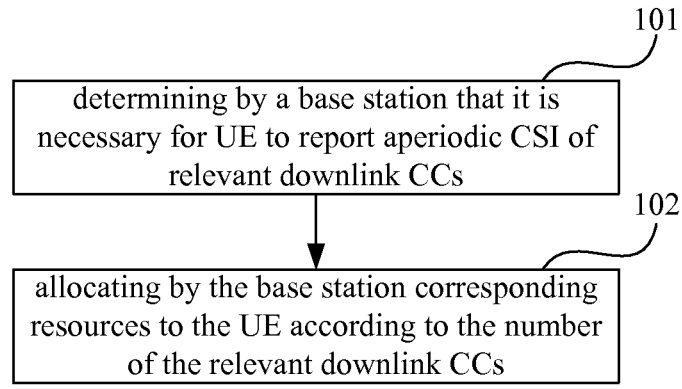
FIG. 1 is a flowchart of the method for resource allocation of embodiment 1.

FIG. 1 is a flowchart of the method for resource allocation of embodiment 1. As shown in FIG. 1, the method comprises:

step 101: determining, by a base station, that a UE should report aperiodic CSI of relevant downlink CCs; and step 102: allocating, by the base station, corresponding resources to the UE according to the number of the relevant downlink CCs.

It can be seen from the above embodiment that the base station may allocate resources according to the number of relevant downlink CCs to which the aperiodic CSI needing to be reported by the UE corresponds, such that the manner of resource allocation is flexible, and supports the transmission of UCI containing aperiodic CSI in case of multiple carriers, thereby overcoming the defect existed in the prior art.

In this embodiment, the aperiodic CSI may comprise a CQI, and also information of PMI and RI for some downlink transmission modes.

In this embodiment, the aperiodic CSI may be contained in UCI and be transmited to the base station via a PUSCH. In addition, ACK/NACK information may also be contained in the UCI together with the CSI for transmitting to the base station via a PUSCH. Whether the ACK/NACK information is transmitted together with the CSI is similar to the prior art, which shall not described any further. In this way, the base station may select typical modulation and coding scheme, multi-antenna processing and HARQ on the basis of the UCI reported by the UE, and adaptively adjusts data transmission dynamically.

In this embodiment, the number of the relevant downlink CCs may be one or more, and the base station allocates resources to the UE according to the number of the relevant downlink CCs.

In this embodiment, the method of allocating by the base station corresponding resources to the UE according to the number of the relevant downlink CCs may as follows:

the maximum number of the resource blocks (RBs) allocated by the base station to the UE is a predefined first number L1 if the base station determines that it is necessary for the UE to report the aperiodic CSI of one downlink CC; and the maximum number of the RBs allocated by the base station to the UE is a predefined second number L2 if the base station determines that it is necessary for the UE to report the aperiodic CSI of more than one downlink CCs;

wherein the second number L2 is greater than the first number L1, and the first number L1 and the second number L2 are determined according to a CCR (Channel Coding Rate). The CCR is within a predefined range by determining the first number L1 and the second number L2. Of course, in some cases, it is possible that the use of the above first number L1 and the second number L2 will make the CCR out of a reasonable range. However, such cases are seldom. Hence, the above first number L1 and the second number L2 are usually considered as being reasonable.

Following description is provided for the above first number L1 and the second number L2 taking one downlink CC and two downlink CCs as examples.

When there is one downlink CC, such as a case similar to an LTE system, if a predefined CCR is less than ⅓, the maximum of the first number L1 is 4, that is, the base station allocates 4 RBs to the UE at most, which makes the CCR within a reasonable range.

Where there are multiple CCs, taking two CCs as an example, if the CCR is still ⅓, the second number L2 should be any value greater than 4. However, in this embodiment, in order not to affect the normal transmission of other data or information in the system, when CSI is contained in UCI for transmission, the second number L2 should be kept as small as possible on the premise that the correct receiving of the UCI is ensured.

Table 1 shows the corresponding values of the CCR in the transmission of various UCI and sounding reference signals (SRSs) in three typical cases of bit lengths of aperiodic CSI (i.e. the payload is 100, 136 and 144, respectively) when the number of the downlink CCs is 2 and the number of the allocated resources is 4. Table 2 shows corresponding values of the CCR in the transmission of various UCI and SRSs in three typical cases of bit lengths of aperiodic CSI when the number of the downlink CCs is 2 and the number of the allocated resources is 5. Table 3 shows corresponding values of the CCR in the transmission of various UCI and SRSs in three typical cases of bit lengths of aperiodic CSI when the number of the downlink CCs is 2 and the number of the allocated resources is 6.

It can be seen from Table 1 that when the number of the downlink CCs is 2, if 4 RBs are still allocated, when the payload of the aperiodic CSI is respectively 136 and 144, the CCR goes beyond the predefined range in the transmission of CQI+A/N+RI or in the transmission of CQI+A/N+SRS+RI; and when the payload of the aperiodic CSI is 100, the CCR goes beyond the predefined range in the transmission of CQI+A/N+SRS+RI. Thus, the correct receiving of the UCI by the base station cannot be ensured.

TABLE 1

| Payload | CQI | CQI + SRS | CQI + A/N | CQI + RI | CQI + A/N + SRS | CQI + RI + SRS | CQI + A/N + RI | CQI + A/N + RI + SRS |
|---|---|---|---|---|---|---|---|---|
| 100 | 0.087 | 0.095 | 0.13 | 0.13 | 0.149 | 0.149 | 0.26 | 0.347 |
| 136 | 0.118 | 0.129 | 0.177 | 0.177 | 0.202 | 0.202 | 0.354 | 0.472 |
| 144 | 0.125 | 0.136 | 0.188 | 0.188 | 0.214 | 0.214 | 0.375 | 0.5 |

TABLE 2

| Payload | CQI | CQI + SRS | CQI + A/N | CQI + RI | CQI + A/N + SRS | CQI + RI + SRS | CQI + A/N + RI | CQI + A/N + RI + SRS |
|---|---|---|---|---|---|---|---|---|
| 100 | 0.069 | 0.076 | 0.104 | 0.104 | 0.119 | 0.119 | 0.208 | 0.278 |
| 136 | 0.094 | 0.103 | 0.142 | 0.142 | 0.162 | 0.162 | 0.283 | 0.378 |
| 144 | 0.1 | 0.109 | 0.15 | 0.15 | 0.171 | 0.171 | 0.3 | 0.4 |

TABLE 3

| Payload | CQI | CQI + SRS | CQI + A/N | CQI + RI | CQI + A/N + SRS | CQI + RI + SRS | CQI + A/N + RI | CQI + A/N + RI + SRS |
|---|---|---|---|---|---|---|---|---|
| 100 | 0.058 | 0.063 | 0.087 | 0.087 | 0.099 | 0.099 | 0.174 | 0.232 |
| 136 | 0.079 | 0.086 | 0.118 | 0.118 | 0.135 | 0.135 | 0.236 | 0.315 |
| 144 | 0.083 | 0.091 | 0.125 | 0.125 | 0.143 | 0.143 | 0.25 | 0.333 |

It can be seen from Table 2 that if the number of the RBs is 5, the CCR goes beyond the predefined range only when the payload of the aperiodic CSI is 136 and CP=144, and the CQI+A/N+SRS+RI is transmitted. However, the case of transmitting CQI+A/N+SRS+RI is seldom. Hence, the number of the RBs being 5 is considered as being a reasonable number.

It can be seen from Table 3 that if the number of the RBs is 6, the CCR is within the predefined range.

It can be seen from above that in determining the number of the allocated resources, not only to make the CCR within a reasonable range, but also to make the number of resources as small as possible are both should be considered, so as to alleviate the effect on the transmission of other resources. It has been proved that it is optimal when the maximum value of the second number L2 is 5 or 6 in case of two CCs.

The case of two CCs is explained above. For cases of more than two CCs, the methods for determining the second number L2 are similar to what is described above. In addition, the method for calculating CCR is similar to the prior art, which shall not be described any further.

It can be seen from the above embodiment that the base station may allocate resources according to the number of relevant downlink CCs to which the aperiodic CSI needing to be reported by the UE corresponds, such that the manner of resource allocation is flexible, and supports the transmission of UCI containing aperiodic CSI in case of multiple carriers, thereby overcoming the defect existed in the prior art.

It should be understood by those skilled in the art that all or part of the steps in the method of the above embodiment may be carried out by relevant hardware with instructions from a program. The program may be stored in a computer-readable storage medium. All or part of the steps in the method of the above embodiment may be included in the execution of this program. The storage medium may comprise an ROM, an RAM, a floppy disc, and a CD, etc.

The embodiments also provide a base station as described below. Since the principle of the base station for solving the problems is similar to that of the method for resource allocation based on a base station, the embodiments of the method may be referred to in the embodiments of the base station, and the similar parts shall not be described any further.

Figure 2:
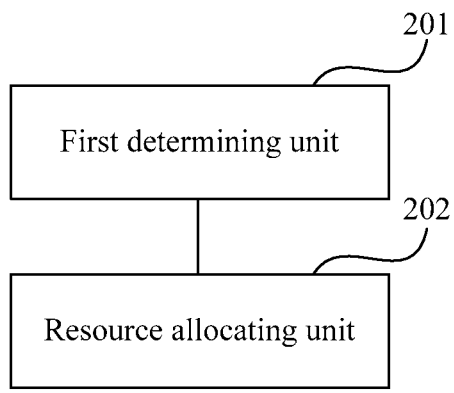
FIG. 2 is a schematic diagram of the structure of the base station of embodiment 2.

FIG. 2 is a schematic diagram of the structure of the base station of embodiment 2. As shown in FIG. 2, the base station comprises: a first determining unit 201 and a resource allocating unit 202; wherein the first determining unit 201 is used for determining that a UE should report aperiodic CSI of relevant downlink CCs, and the resource allocating unit 202 is used for allocating corresponding resources to the UE according to the number of the relevant downlink CCs.

Figure 3:
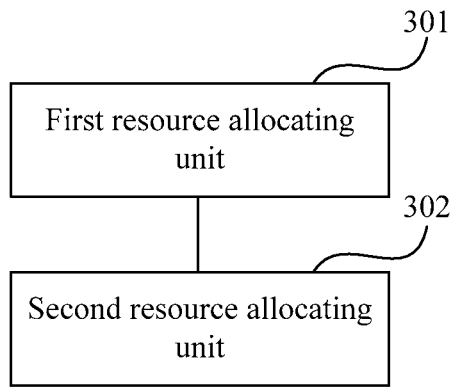
FIG. 3 is a schematic diagram of the structure of the resource allocating unit of embodiment 2.

FIG. 3 is a schematic diagram of the structure of the resource allocating unit of FIG. 2. As shown in FIG. 3, the resource allocating unit 202 may comprise a first resource allocating unit 301 and a second resource allocating unit 302; wherein the first resource allocating unit 301 is used for allocating maximum resources of a predefined first number L1 to the UE if the first determining unit 201 determines that it is necessary for the UE to report the aperiodic CSI of one downlink CC, the second resource allocating unit 302 is used for allocating maximum resources of a predefined second number L2 to the UE if the first determining unit 201 determines that it is necessary for the UE to report the aperiodic CSI of more than one downlink CCs;

wherein the second number L2 is greater than the first number L1, and the first number L1 and the second number L2 are determined according to a CCR.

In this embodiment, the manner for determining the first number L1 and the second number L2 is as described in embodiment 1, and shall not be described any further.

It can be seen from the above embodiment that the base station may allocate resources according to the number of relevant downlink CCs to which the aperiodic CSI needing to be reported by the UE corresponds, such that the manner of resource allocation is flexible, and supports the transmission of UCI containing aperiodic CSI in case of multiple carriers, thereby overcoming the defect existed in the prior art.

Figure 4:
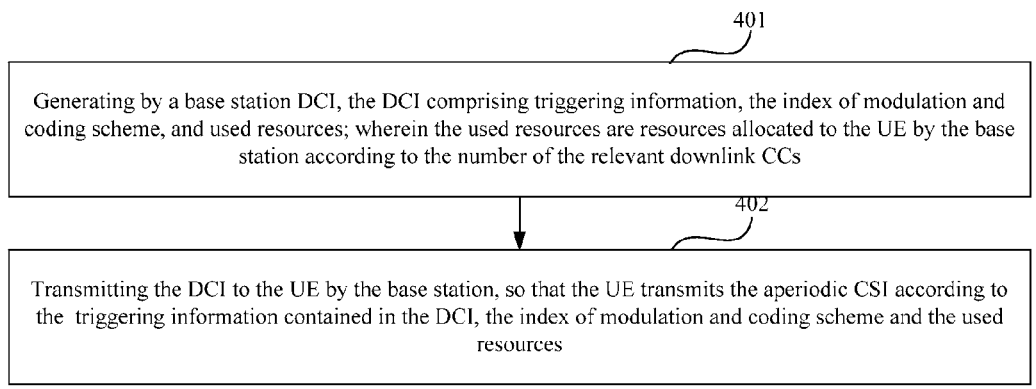
FIG. 4 is a flowchart of the method for transmitting UCI of embodiment 3.

FIG. 4 is a flowchart of the method for UCI transmission of embodiment 3. As shown in FIG. 4, the method comprises:

step 401: generating by a base station DCI, the DCI comprising triggering information which indicates a UE whether to report aperiodic CSI of relevant downlink CCs and indicates the indices and number of the relevant downlink CCs when reporting the aperiodic CSI of the relevant downlink CCs, the index of modulation and coding scheme, and used resources; wherein the used resources are resources allocated to the UE by the base station according to the number of the relevant downlink CCs; and step 402: transmitting the DCI to the UE by the base station, so that the UE transmits the aperiodic CSI according to the triggering information, the index of modulation and coding scheme and the used resources contained in the DCI.

In this embodiment, in step 401, when the base station determines that it is necessary for the UE to report the aperiodic CSI of the relevant downlink CCs, it can generate the DCI according to the transmission mode and the demand of the system, so as to instruct the UE to report the UCI; wherein in generating the DCI, the base station allocates the used resources to the UE according to the number of the relevant downlink CCs. Furthermore, corresponding triggering information and a predefined index of modulation and coding scheme may be selected according to preconfigured corresponding relationship between the triggering information and the downlink CCs.

In this embodiment, an existing method may be used in the process of generating the DCI, which shall not be described any further. In addition, the method of allocating the used resources to the UE by the base station according to the number of the relevant downlink CCs is as described in embodiment 1, and shall not be described any further.

In this embodiment, the DCI generated in step 101 may be transmitted in a physical downlink control channel (PDCCH), wherein the bit information in DCI format 0 or DCI format 4 may be used for bearing this information.

Table 4 shows the bear information and length of the DCI format 0 in the LTE-A system of the embodiments, and Table 5 shows the bear information and length of the DCI format 4 in the LTE-A system of the embodiments.

TABLE 4

| | |
|---|---|
| Flag for DCI 0/1A | 1 |
| Hopping flag | 1 |
| Resource allocation | 11 |
| Modulation and coding scheme | 5 |
| New data indicator | 1 |
| Power control for PUSCH | 2 |
| Cyclic shift for DMRS and OCC | 3 |
| Aperiodic CQI request | 2 |
| Aperiodic SRS request | 1 |
| Multi-cluster flag | 1 |
| Payload | 28 |

TABLE 5

| | |
|---|---|
| Resource allocation | 11 |
| Power control for PUSCH | 2 |
| Cyclic shift for DMRS and OCC | 3 |
| Aperiodic CQI request | 2 |
| Aperiodic SRS request | 2 |
| Multi-cluster flag | 1 |
| Modulation and coding scheme for $1^{st}$ TB | 5 |
| New data indicator for $1^{st}$ TB | 1 |
| Modulation and coding scheme for $2^{nd}$ TB | 5 |
| New data indicator for $2^{nd}$ TB | 1 |
| PMI/RI | 3/6 |
| Payload | 36/39 |

Wherein, the "CQI request" with 2 bits in Table 4 or Table 5 may be used to bear the above triggering information. Hence, the corresponding states may be "00", "01", "10" and "11". The above four states may be respectively used to indicate whether to report aperiodic CSI, and a set of different downlink CCs in indicating to report aperiodic CSI.

For example, when the two bits are "00", it may indicate not to report the aperiodic CSI, but to transmit uplink data on the PUSCH only; when the two bits are "01/10", it may indicate to report the aperiodic CSI, and the number of the downlink CCs contained in the downlink CC set is 1; and when the two bits are "11", it may indicate to report the aperiodic CSI, and the number of the downlink CCs contained in the downlink CC set is more than 1, such as two CCs, it may also indicate the index of each CC. Such corresponding relationship may be configured at the base station side via high layer signaling and stored for use by the base station in generating the DCI. The above manner of indication is merely an embodiment, and the above triggering information may also be configured as the cases may be.

In this embodiment, when the aperiodic CSI is contained in the UCI and be transmitted to the base station via the PUSCH, the transmission of the UCI containing the aperiodic CSI via the PUSCH may be classified into: 1) the UCI is separately transmitted on the PUSCH (CQI-only PUSCH), i.e. the uplink data is not transmitted when the aperiodic CSI is transmitted; and 2) the aperiodic CSI is transmitted together with the uplink data on the PUSCH, i.e. the uplink data is also transmitted when the aperiodic CSI is transmitted. Wherein, which manner is used for transmitting the UCI may be judged according to the triggering information, the modulation and coding scheme, and used resources, which shall be described in detail in embodiment 5.

In this embodiment, the base station needs to configure multiple groups of relevant downlink CC sets in advance for UE, correspondingly store the sets, together with the triggering information, such as the 2 bits information in DCI format 0/4, and also store the corresponding relationship at the UE side, for the UE to judge whether to transmit aperiodic CSI and in transmitting the aperiodic CSI, to determine the number and indices of the relevant downlink CCs.

Thus, in this embodiment, before the base station generates DCI for the UE being required to report the aperiodic CSI, the method further comprises:

configuring, by the base station, the UE with a plurality groups of relevant downlink CC sets; storing correspondingly the triggering information and the plurality groups of relevant downlink component carrier sets; and selecting, by the base station, corresponding triggering information according to the indices and the number of the relevant downlink CCs when generating the DCI.

For example, the following description is provided taking that the aperiodic CSI is contained in the UCI for transmission as an example. Table 6 and Table 7 respectively shows the corresponding relationship between the triggering information configured by the base station of the embodiments and a plurality groups of relevant downlink CC sets. However, Table 6 and Table 7 are merely embodiments, certain embodiments are not limited thereto, and the base station may configure as the cases may be.

TABLE 6

| Triggering information | Downlink CC sets |
|---|---|
| 00 | UCI containing the aperiodic CSI is not transmitted |
| 01 | UCI containing the aperiodic CSI of 1 downlink CC is transmitted, with the index of the downlink CC being 1 (the downlink CC is the pairing downlink CC configured via the system information for the uplink CC of the PUSCH carrying the UCI) |
| 10 | UCI containing the aperiodic CSI of 1 downlink CC is transmitted, with the index of the downlink CC being 2 |
| 11 | UCI containing the aperiodic CSI of 2 downlink CCs is transmitted, with the indices of the downlink CCs being 1 and 2 |

TABLE 7

| Triggering information | Downlink CC sets |
|---|---|
| 00 | UCI containing the aperiodic CSI is not transmitted |
| 01 | UCI containing the aperiodic CSI of 1 downlink CC is transmitted, with the index of the downlink CC being 2 (the downlink CC is the pairing downlink CC configured via the system information for the uplink CC of the PUSCH carrying the UCI) |
| 10 | UCI containing the aperiodic CSI of 2 downlink CCs is transmitted, with the indices of the downlink CCs being 1 and 2 |
| 11 | UCI containing the aperiodic CSI of all the 5 configured or activated downlink CCs is transmitted, with the indices of the downlink CCs being 1, 2, 3, 4 and 5 |

It can be seen from above that if the base station is configured with the corresponding relationship as shown in Table 7, the corresponding relationship is also stored at the UE side. For example, if the base station learns that it is necessary for the UE to report the CSI of all the downlink CCs configured by the system and the CSI are contained in the UCI for transmission, the base station may learn through Table 7 that the corresponding triggering information is "11", and uses the "CQI request" in the DCI to carry the triggering information "11". Thus, when the UE receives the DCI, it may read triggering information "11" from the DCI, and learns, by looking up Table 7, that the report contains the UCI of the aperiodic CSI of all the downlink CCs configured by the system.

In the embodiments, in the relevant downlink CC set, when the number of the relevant downlink CCs is 1, the relevant downlink CC may be the pairing downlink CC configured by the uplink CC of the PUSCH carrying the UCI via a system information block (SIB-2), as the cases to which the triggering information "01" in Table 6 and Table 7 corresponds; in addition, the relevant downlink CC may not be the downlink CC, linked via an SIB-2, to which the uplink CC of the PUSCH carrying the aperiodic CSI corresponds, as the case to which "10" in Table 6 corresponds.

For example, an uplink component carrier (UL CC) is configured with UL CC #1 and UL CC #2, and a downlink CC is configured with DL CC #1, DL CC #2 and DL CC #3; wherein the relationship between UL CC #1 and DL CC #1 is linked by an SIB-2, and the relationship between UL CC #2 and DL CC #3 is linked by an SIB-2, but DL CC #2 has no UL CC linked by the SIB-2. The UCI of DL CC #2 may be transmitted via UL CC #1 or UL CC #2. For example, if DCI format 0 is used to schedule the PUSCH on UL CC #1, when the triggering information in DCI format 0 is "10", it indicates that the aperiodic CSI of DL CC #2 will be transmitted on the PUSCH at UL CC #1.

In this embodiment, in the relevant downlink CC set, when the number of the relevant downlink CCs is more than 1, the relevant downlink CC may be more than one configured or activated downlink CCs, as the case to which "11" in Table 7 corresponds, and may be other downlink CCs, as the cases to which "11" in Table 6 and "10" in Table 7 correspond.

It can be seen from the above embodiment that the base station may allocate resources according to the number of relevant downlink CCs to which the aperiodic CSI needing to be reported by the UE corresponds, such that the manner of resource allocation is flexible, and supports the transmission of UCI containing aperiodic CSI in case of multiple carriers, thereby overcoming the defect existed in the prior art. And when the UE transmits the UCI containing the aperiodic CSI by using the resources allocated by the base station according to the number of the downlink CCs, the accuracy of receiving information by the base station may be ensured, and the limitation of the scheduling of the data transmission may be reduced.

Certain embodiments provide a base station as described below in embodiment 4. Since the principle of the base station for solving the problems is similar to that of the method for UCI transmission based on a base station in embodiment 3, the embodiments of the method may be referred to in the embodiments of the base station, and the similar parts shall not be described any further.

Figure 5:
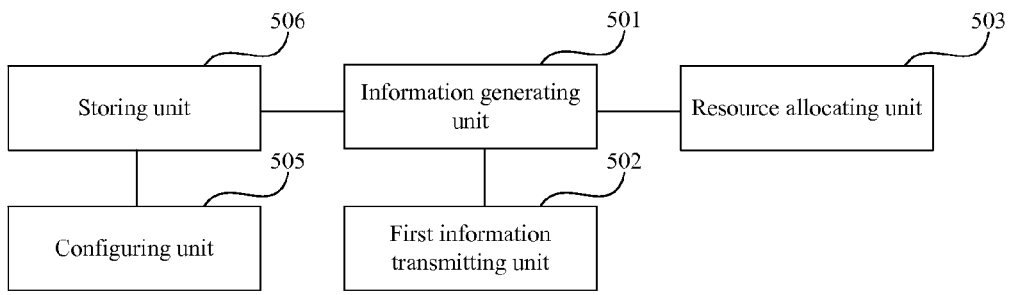
FIG. 5 is a schematic diagram of the structure of the base station of embodiment 4.

FIG. 5 is a schematic diagram of the structure of the base station of embodiment 4. As shown in FIG. 5, the base station comprises an information generating unit 501 and a first information transmitting unit 502, wherein the information generating unit 501 is used for generating DCI, the DCI comprising triggering information which indicates UE whether to report aperiodic CSI of relevant downlink CCs and indicates the indices and number of the relevant downlink CCs when reporting the aperiodic CSI of the relevant downlink CCs, an index of modulation and coding scheme, and used resources; wherein the used resources are resources allocated to the UE by the base station according to the number of the relevant downlink CCs; and the first information transmitting unit 502 is used for transmitting the DCI to the UE, so that the UE transmits the aperiodic CSI according to the triggering information, the index of modulation and coding scheme, and the used resources contained in the DCI.

In this embodiment, when the information generating unit 501 determines that it is necessary for the UE to report the aperiodic CSI of the relevant downlink CCs, it may generate the DCI according to the transmission mode and demand of the system, so as to instruct the UE to report the aperiodic CSI; wherein in the generated DCI, the used resources are those allocated to the UE by the base station according to the number of relevant downlink CCs.

In this embodiment, the DCI may be transmitted in a PUSCH. Wherein, the triggering information may be carried by using the "CQI request" with 2 bits in DCI format 0 or 4. Details are as described in embodiment 3, which shall not be described any further.

In this embodiment, the base station further comprises a resource allocating unit 503 for allocating corresponding resources to the UE according to the number of the relevant downlink CCs. In particular, the resource allocating unit 503 may comprise a first resource allocating unit and a second resource allocating unit (not shown and similar to 301 and 302 in FIG. 3, respectively); wherein the first resource allocating unit is used for allocating maximum resources of a predefined first number L1 to the UE when it is necessary for the UE to report the aperiodic CSI of one downlink CC; and the second resource allocating unit is used for allocating maximum resources of a predefined second number L2 to the UE when it is necessary for the UE to report the aperiodic CSI of more than one downlink CCs; wherein the second number L2 is greater than the first number L1, and the first number L1 and the second number L2 are determined based on a CCR. The specific embodiment of determining L1 and L2 is as described in embodiment 1, which shall not be described any further.

Furthermore, as shown in FIG. 5, the base station may comprise a configuring unit 505 and a storing unit 506; wherein the configuring unit 505 is used for configuring the UE with a set of a plurality of relevant downlink CCs;

wherein the base station may perform configuration via high layer signalling, such as RRC; and the storing unit 506 is used for correspondingly storing the triggering information and a plurality of groups of sets of relevant downlink CCs, as shown in Table 6 and Table 7.

Thus, when the information generating unit 501 generates the downlink DCI, it selects corresponding triggering information according to the indices and number of the relevant downlink CCs.

It can be seen from the above embodiment that when the information generating unit 501 determines it is necessary for the UE to report the aperiodic CSI of the relevant downlink CCs, it may select corresponding triggering information, modulation and coding scheme and used resources to generate DCI in accordance with actual situation, and then transmits above information to the UE. Since the base station may allocate resources in accordance with the number of the downlink CCs, the manner of resource allocation becomes flexible, and the transmission of UCI in case of multiple carriers is supported.

Figure 6:
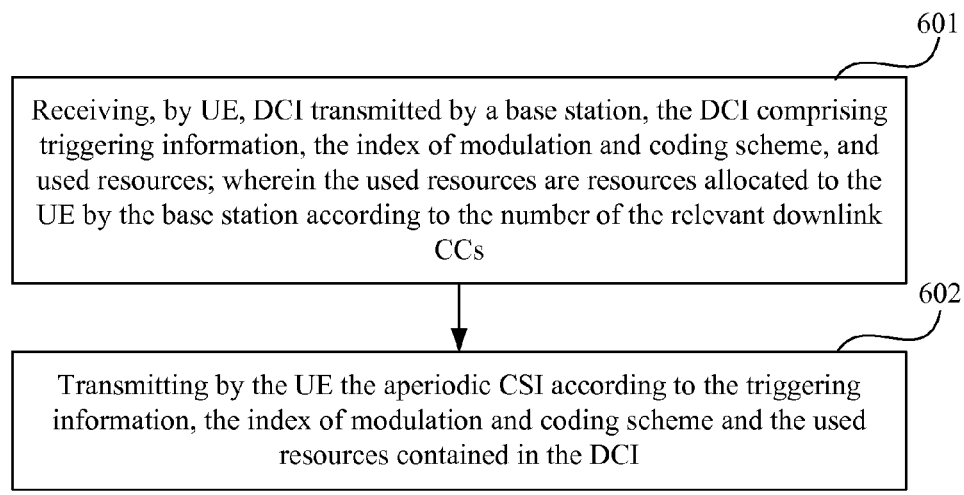
FIG. 6 is a flowchart of the method for transmitting UCI of embodiment 5.

FIG. 6 is a flowchart of the method for UCI transmission of embodiment 5. As shown in FIG. 6, the method comprises:

step 601: receiving, by UE, DCI transmitted by a base station, the DCI comprising triggering information which indicates the UE whether to report aperiodic CSI of relevant downlink CCs and indicates the indices and number of the relevant downlink CCs when reporting the aperiodic CSI of the relevant downlink CCs, the index of modulation and coding scheme, and used resources; wherein the used resources are resources allocated to the UE by the base station according to the number of the relevant downlink CCs;

wherein, the base station may transmits the DCI via a PCCCH, and the UE may read the triggering information, index of modulation and coding scheme (MCS) and the used resource blocks from the DCI;

step 602: transmitting by the UE the aperiodic CSI according to the triggering information, the index of modulation and coding scheme and the used resources contained in the DCI.

Wherein, the UE reports the aperiodic CSI via the UCI, and the UCI is transmitted to the base station via a PUSCH. The transmission of the UCI via the PUSCH may be classified into: 1) the UCI is separately transmitted via the PUSCH (CQI-only PUSCH), i.e. the uplink data is not transmitted when the aperiodic CSI is transmitted; and 2) the aperiodic CSI is transmitted together with the uplink data via the PUSCH, i.e. the uplink data is also transmitted when the aperiodic CSI is transmitted. Wherein, which manner is used for transmitting the UCI may be judged according to a particular combination of the triggering information, the modulation and coding scheme, and the number of used resources. Following is the detailed description.

Following description is provided taking that the CSI is contained in the UCI and be transmitted to the base station via a PUSCH as an example. In addition, ACK/NACK information may also be transmitted together with the aperiodic CSI to the base station via the UCI. Whether the ACK/NACK information is transmitted together with the aperiodic CSI is similar to the prior art, which shall not described any further.

Figure 7:
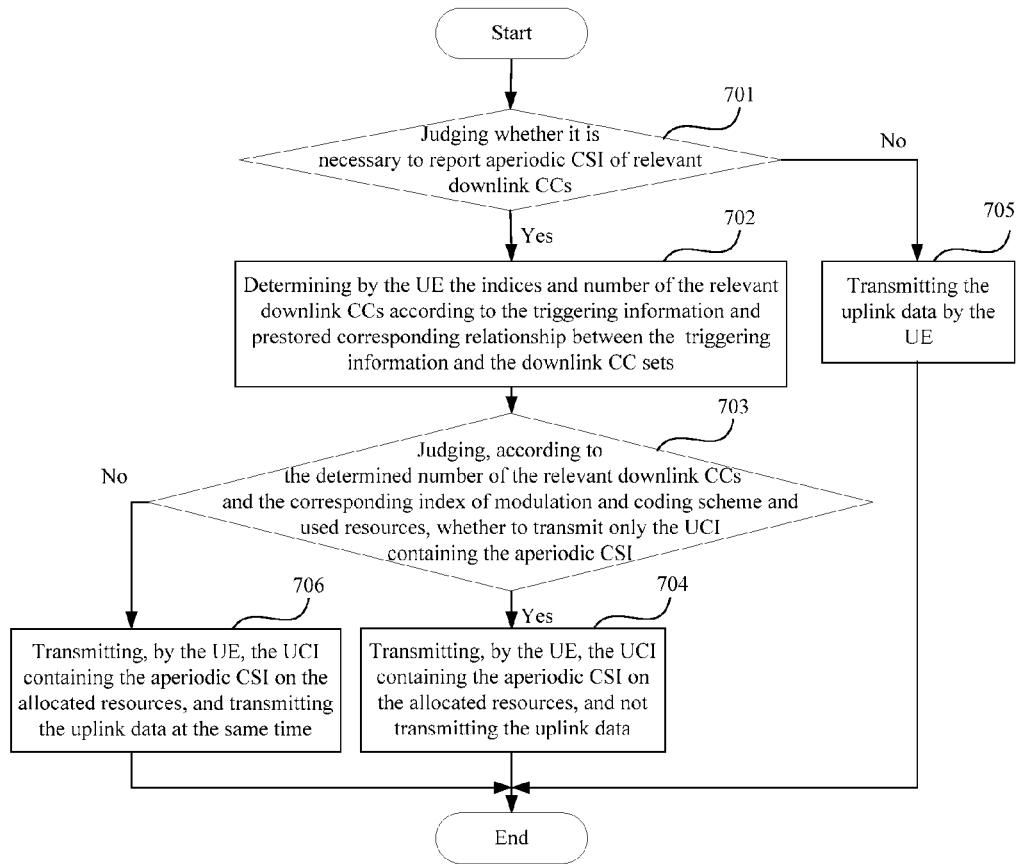
FIG. 7 is a flowchart of implementation of step 602 of embodiment 5.

FIG. 7 is a flowchart of implementation of step 602 of embodiment 5. As shown in FIG. 7, the following manner may be used for the UE to transmit the aperiodic CSI in accordance with the triggering information, the index of modulation and coding scheme, and the used resources contained in the DCI:

step 701: judging, by the UE, whether it is necessary to report aperiodic CSI of relevant downlink CCs according to the triggering information in received DCI; executing step 702 if the result of judgement is positive; and executing step 705 if the result of judgement is negative;

wherein, the triggering information may be carried using the "CQI request" with 2 bits in DCI format 0 or DCI format 4;

the UE may determine whether to report the aperiodic CSI of the relevant downlink CCs in accordance with the triggering information and prestored corresponding relationship between the triggering information and the downlink CC sets;

for example, according to the corresponding relationship in Table 6 or Table 7, if the 2 bits information is "00", the UE may determine that it is not necessary to report the aperiodic CSI; and if in the DCI, the 2 bits information is "11/01/10", the UE may determine that it is necessary to report the aperiodic CSI, and may learn the number and indices of the relevant downlink CCs from Table 6 or Table 7;

step 702: determining by the UE the indices and number of the relevant downlink CCs according to the triggering information and prestored corresponding relationship between the triggering information and the downlink CC sets if the result of judgement in step 701 is that it is necessary to report the aperiodic CSI;

for example, it may be determined in accordance with the corresponding relationship in Table 6 or Table 7. For example, if it determines that the triggering information is "01", it may be learnt that the UCI containing the aperiodic CSI of 1 downlink CC is transmitted, and the index of the downlink CC is 1;

step 703: judging, according to the determined number of the relevant downlink CCs and the corresponding index of modulation and coding scheme and used resources, whether to only transmit the UCI containing the aperiodic CSI; and executing step 704 if the result of judgement is that the UCI is only transmitted, otherwise, executing step 706;

wherein, the particular process of judgement will be described in detail below with reference to FIG. 8;

step 704: transmitting at a predefined time, by the UE, the UCI containing the aperiodic CSI via a PUSCH on the resources which are allocated to the UE by the base station, and not transmitting the uplink data at the same time, if the result of judgement in step 703 is positive;

wherein, the UE transmits the UCI containing the aperiodic CSI on the used resources allocated by the base station to the UE, and ACK/NACK information may be contained in the UCI for transmission together with the aperiodic CSI;

step 705: transmitting only the uplink data by the UE on the PUSCH, if the result of judgement in step 701 is negative;

step 706: transmitting, by the UE, the UCI containing the aperiodic CSI on the resources which are allocated to the UE by the base station, if the result of judgement in step 703 is negative;

wherein, when the UCI containing the aperiodic CSI and the uplink data are transmitted, the UCI containing the aperiodic CSI may be multiplexed with the uplink data and be transmitted together to the base station on the PUSCH; that is, part of the resources of the uplink data are used when the UCI containing the aperiodic CSI is transmitted, and extra signalling which used to indicate this part of the resources is not necessary, this part of the resources may be agreed in advance to be used in such a case between the UE and the base station.

Figure 8:
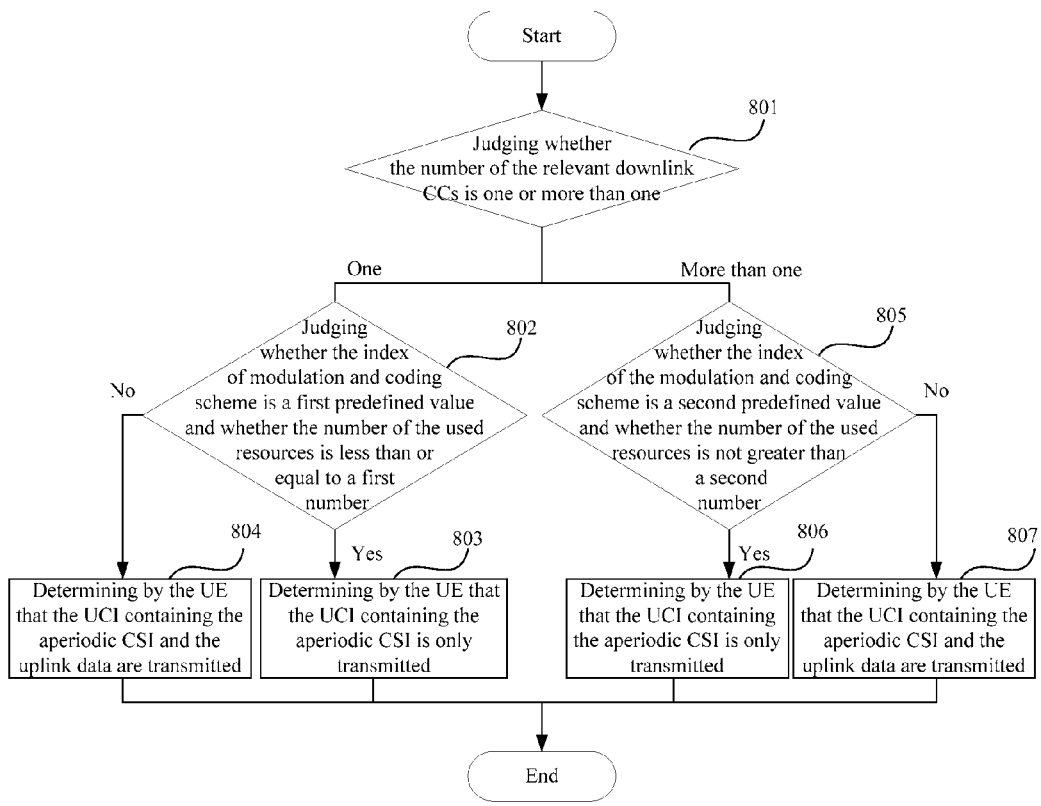
FIG. 8 is a flowchart of implementation of step 703 of embodiment 5.

FIG. 8 is a flowchart of implementation of step 703 of embodiment 5. As shown in FIG. 8, it comprises:

step 801: judging whether the number of the relevant downlink CCs is one or more than one; executing step 802 if the result of judgement is that the number is 1, and executing step 805 if the result of judgement is that the number is more than 1;

step 802: judging further whether the index of modulation and coding scheme is a first predefined value and whether the number of the used resources is less than or equal to a first number when the relevant downlink CCs is one; executing step 803 if the result of judgement is positive, otherwise, executing step 804;

in this embodiment, judging whether the index of modulation and coding scheme is 29, and whether the number of the used resources is not more than 4;

step 803: determining that the UCI containing the aperiodic CSI is only transmitted and the uplink data is not transmitted, if the result of judgement in step 802 is positive;

step 804: determining that the UCI containing the aperiodic CSI and the uplink data are transmitted, if the result of judgement in step 802 is negative;

step 805: judging further whether the index of the modulation and coding scheme is a second predefined value and whether the number of the used resources is less than or equal to a second number; executing step 806 if the result of judgement is positive, otherwise, executing step 805;

in this embodiment, judging whether the index of modulation and coding scheme is 29, and whether the number of the used resources is not more than L; wherein the second number L is greater than the first number and preferably 5 or 6;

step 806: determining that the UCI containing the aperiodic CSI is only transmitted and the uplink data is not transmitted, if the result of judgement in step 805 is positive; and step 807: determining that the UCI containing the aperiodic CSI and the uplink data are transmitted, if the result of judgement in step 805 is negative.

It can be seen from the above embodiment that the UE may determine the number of the relevant downlink CCs according to the received triggering information, thereby determining the transmission of the aperiodic CSI according to the number of the relevant downlink CCs, the modulation and coding scheme and the used resources, and the aperiodic CSI may be contained in the UCI for transmission; such a method is applicable to the transmission of UCI in case of multiple carriers, thereby overcoming the defect existed in the prior art.

Certain embodiments also provide UE as described below in embodiment 6. Since the principle for the UE to solve the problems is similar to that of the method for UCI transmission based on a base station as described above, the embodiments of the method may be referred to in the embodiments of the UE, and the similar parts shall not be described any further.

Figure 9:
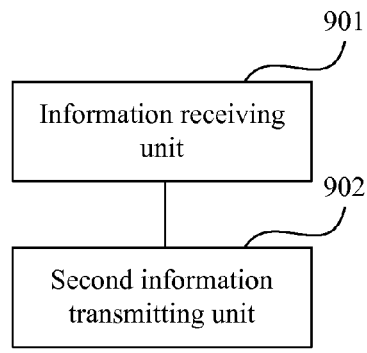
FIG. 9 is a schematic diagram of the structure of the UE of embodiment 6.
Figure 10:
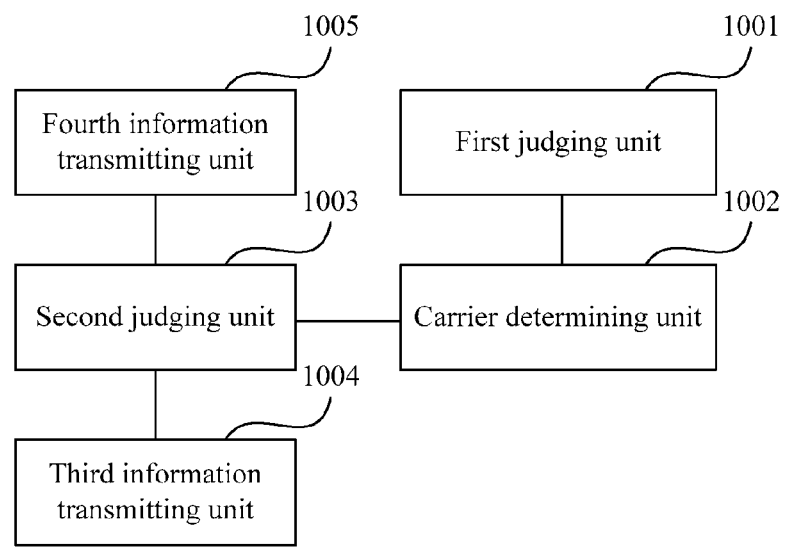
FIG. 10 is a schematic diagram of the structure of the second information transmitting unit of FIG. 9.

FIG. 9 is a schematic diagram of the structure of the UE of embodiment 6. As shown in FIG. 9, the UE comprises an information receiving unit 901 and a second information transmitting unit 902; wherein the information receiving unit 901 is used for receiving DCI transmitted by a base station, the DCI comprising triggering information which indicates the UE whether to report aperiodic CSI of relevant downlink CCs and indicates the index and number of the relevant downlink CCs when reporting the aperiodic CSI of the relevant downlink CCs, an index of modulation and coding scheme, and used resources; wherein the used resources are resources allocated to the UE by the base station according to the number of the relevant downlink CCs; and the second information transmitting unit 902 is used for transmitting the aperiodic CSI according to the triggering information, the index of modulation and coding scheme and the used resources contained in the downlink control information. FIG. 10 is a schematic diagram of the structure of the second information transmitting unit of FIG. 9. As shown in FIG. 10, the second information transmitting unit 902 comprises:

a first judging unit 1001 for judging whether it is necessary to report aperiodic CSI of relevant downlink CCs according to triggering information;

a carrier determining unit 1002 for determining the indices and number of the relevant downlink CCs according to the triggering information and prestored corresponding relationship between the triggering information and downlink CC sets, if the result of judgement of the first judging unit 1001 is that it is necessary to report aperiodic CSI of relevant downlink CCs;

a second judging unit 1003 for judging whether only the aperiodic CSI is transmitted according to the number of the relevant downlink CCs determined by the carrier determining unit 1002, a corresponding index of modulation and coding scheme and the used resources;

a third information transmitting unit 1004 for transmitting the aperiodic CSI on the resources allocated by the base station to the UE, if the result of judgement of the second judging unit 1003 is that the uplink data is not transmitted when the aperiodic CSI is transmitted; and a fourth information transmitting unit 1005 for transmitting the aperiodic CSI and the uplink data on the resources allocated by the base station to the UE, if the result of judgement of the second judging unit 1003 is that not only the aperiodic CSI but also the uplink data are transmitted.

Furthermore, the UE may comprise a storing unit (not shown) for storing the corresponding relationship between the triggering information and the downlink CC sets, for use by the UE.

Figure 11:
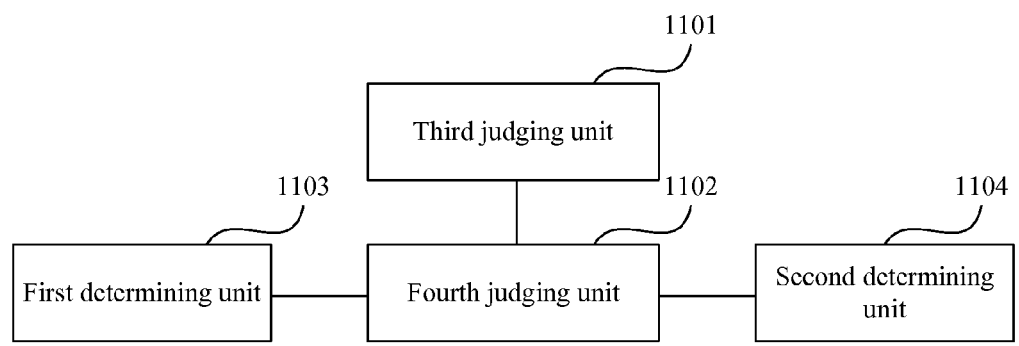
FIG. 11 is a schematic diagram of the structure of the second judging unit of FIG. 10.

FIG. 11 is a schematic diagram of the structure of the second judging unit of FIG. 10. As shown in FIG. 11, the second judging unit 1003 comprises:

a third judging unit 1101 for judging whether the number of the relevant downlink CCs is one or more;

a fourth judging unit 1102 for further judging whether the index of the modulation and coding scheme contained in the DCI is a predefined index and whether the number of the used resources is less than or equal to a first predefined value, if the result of judgement of the third judging unit 1101 is that the number of the relevant downlink CCs is one; or, for further judging whether the index of the modulation and coding scheme contained in the DCI is a predefined index and whether the number of the used resources is less than or equal to a second predefined value, if the result of judgement of the third judging unit 1101 is that the number of the relevant downlink CCs is more than one; wherein the second number is greater than the first number, and the first number and the second number are determined according to a CCR;

a first determining unit 1103 for determining that the uplink data is not transmitted when the aperiodic CSI is transmitted, if the result of the fourth judging unit 1102 is positive; and a second determining unit 1104 for determining that the uplink data is also transmitted when the aperiodic CSI is transmitted, if the result of the fourth judging unit 1102 is negative.

Wherein the UE may report the aperiodic CSI via the UCI, and the UCI is transmitted to the base station via the PUSCH. The manners of embodiment 5 shown in FIGS. 7 and 8 may be used for carrying out every functional units of the second information transmitting unit 902, which shall not be described any further.

It can be seen from the above embodiment that the UE may determine the number of the relevant downlink CCs according to the received triggering information, thereby determining the transmission of the aperiodic CSI according to the number of the relevant downlink CCs, the modulation and coding scheme and the used resources; such a method is applicable to the transmission of UCI in case of multiple carriers, ensures the accuracy of receiving information by the base station, and reduces the limitation of the scheduling of the data transmission.

The above embodiment is applicable to an LTE-A system, and a following example will be described to explain the present embodiment in detail. In this example, aperiodic CSI is reported via UCI and the index of the modulation and coding scheme is 29; the number of the resources used when the number of the downlink CCs is 1, i.e. the first number L1, is less than or equal to 4, and the number of the resources used when the number of the downlink CCs is 2, i.e. the second number L2, is less than or equal to 5.

Figure 12:
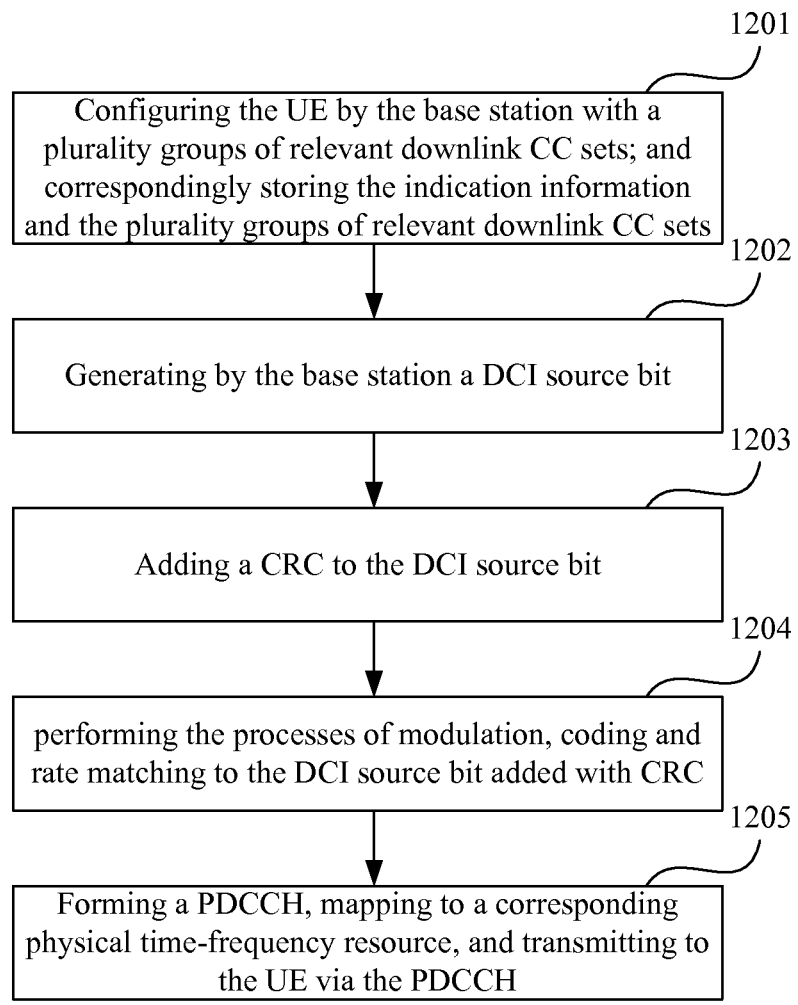
FIG. 12 is a flowchart of the method for transmitting UCI at a base station side of embodiment 7.

FIG. 12 is a flowchart of the method for UCI transmission at a base station side of embodiment 7. As shown in FIG. 12, the method comprises:

step 1201: configuring the UE by the base station with a plurality groups of relevant downlink CC sets; and correspondingly storing the triggering information and the plurality groups of relevant downlink CC sets;

as shown in Table 6 or Table 7, this embodiment will be described taking Table 6 as an example;

step 1202: generating by the base station a corresponding DCI source bit according to the transmission mode and the demand of the system, when the base station determines that the UE should report the aperiodic CSI of the relevant downlink CCs, such as the base station determines that the UE should report the aperiodic CSI of downlink CCs with indices 1 and 2, with the process of generation being similar to the prior art, which shall not be described any further;

wherein, the DCI may contain triggering information "11", which may be carried by using the "CQI request" in DCI format 0 or 4, with the index of the modulation and coding scheme being 29, and the number of the resources L2 being 5;

step 1203: adding a cyclic redundancy check (CRC) code by the base station to the generated DCI source bit;

step 1204: performing the processes of modulation, encoding and rate matching to the DCI source bit added with CRC;

step 1205: forming a PDCCH, mapping to a corresponding physical time-frequency resource, and transmitting to the UE via the PDCCH.

Figure 13:
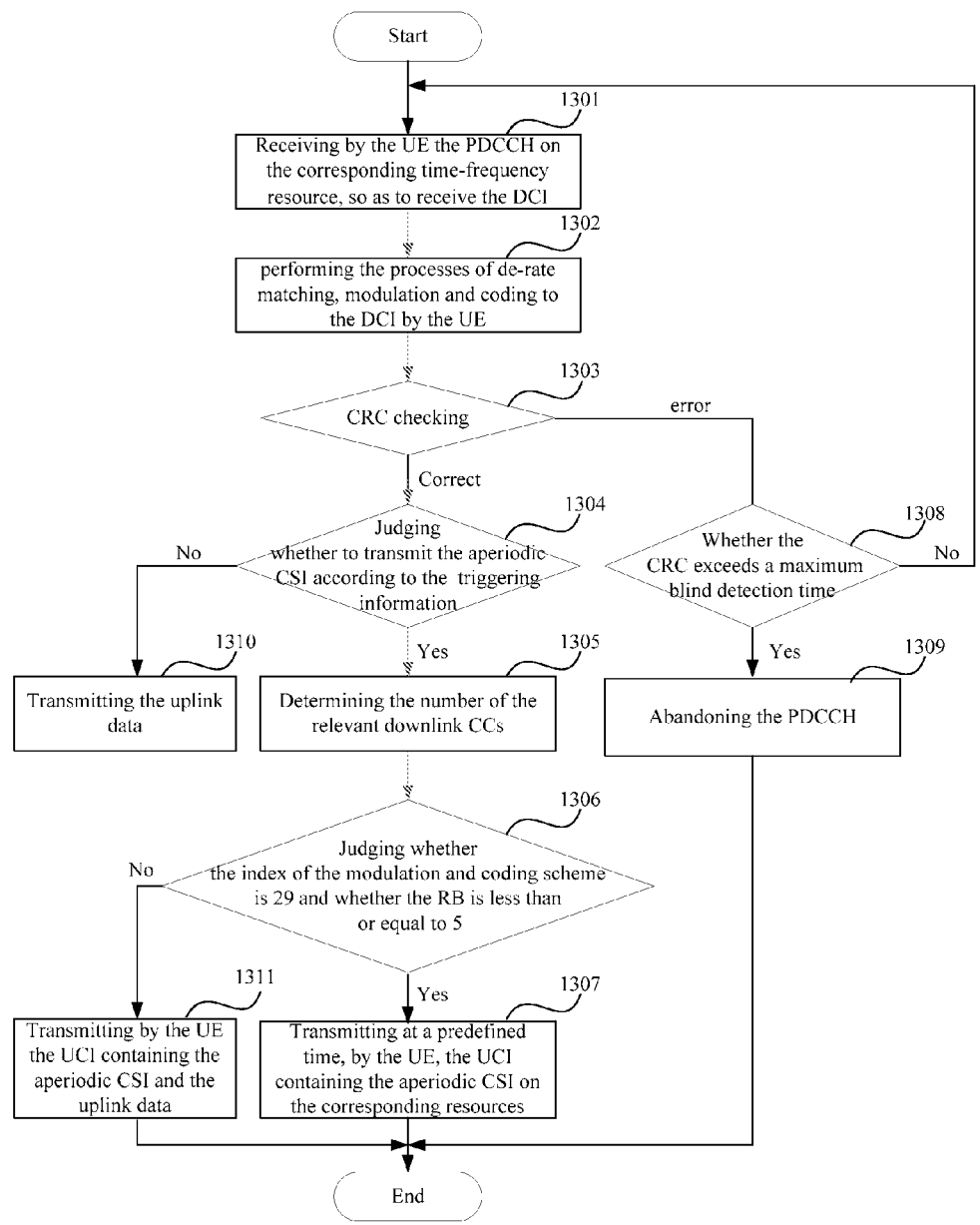
FIG. 13 is a flowchart of the method for transmitting UCI at a UE side of embodiment 7.

FIG. 13 is a flowchart of the method for UCI transmission at a UE side of embodiment 7. First, the UE detects possible DCI in accordance with the transmission mode, and then determines whether to transmit the UCI containing the aperiodic CSI or whether to transmit only the UCI containing the aperiodic CSI according to the detected DCI. As shown in FIG. 13, the method comprises:

step 1301: receiving by the UE the PDCCH on the corresponding resource, and receiving the DCI;

step 1302: performing the processes of de-rate matching, de-modulation and de-coding to the DCI;

step 1303: judging whether the CRC is correct or not; and executing step 1304, if the result of judgment is positive, otherwise, executing step 1308;

step 1304: further judging whether to transmit the UCI containing the aperiodic CSI in accordance with the triggering information in the DCI, the index of the modulation and coding scheme and the used resources, if the result of judgment of step 1303 is that the CRC is correct; and executing step 1305 if the result of judgment is to transmit the UCI, otherwise, executing step 1310;

wherein, "11" indicates that the UCI containing the aperiodic CSI of the downlink CCs with the indices 1 and 2 is transmitted;

step 1305: further determining the number of the downlink CCs, if the result of judgment in step 1304 is positive;

it can be seen from above that the number of the downlink CCs is 2;

step 1306: further judging whether the index of the modulation and coding scheme is 29 and whether the number of the used resources is less than or equal to 5 according to the number of the downlink CCs; and executing step 1306, if the result of judgment is positive, otherwise, executing step 1311;

in this embodiment, if L2 is 5 and the index of the modulation and coding scheme is 29, the result of judgment is positive;

step 1307: transmitting at a predefined time, by the UE, the UCI containing the aperiodic CSI on the resources which are allocated to the UE by the base station, with the UCI containing the aperiodic CSI being only transmitted, and the uplink data being not transmitted, if the result of judgement in step 1305 is positive;

step 1308: if the result of step 1303 is that the CRC is wrong, then further determining whether the CRC exceeds a maximum blind detection time, and executing step 1309, if the result of determining is positive, otherwise, returning back to step 1301;

step 1309: abandoning the PDCCH and terminating the process, if the result of judgment in step 1308 is positive;

step 1310: transmitting the uplink data via the PUSCH only and then terminating the process (not shown), if the result of judgment in step 1304 is negative; and step 1311: transmitting the uplink data and the UCI containing the aperiodic CSI on the PUSCH, if the result of judgment in step 1306 is negative;

wherein, the UCI containing the aperiodic CSI may be multiplexed with the uplink data and be transmitted together to the base station on the PUSCH; that is, part of the resources of the uplink data are used when the UCI containing the aperiodic CSI is transmitted, and extra signalling which used to indicate this part of the resources is not necessary, this part of the resources may be agreed in advance to be used in such a case between the UE and the base station.

The above embodiment is described taking a plurality of downlink CCs as an example. If the number of the downlink CCs is 1, in step 1306, the judgment condition is whether the index of modulation and coding scheme is 29 and whether the number of the resources, i.e. L1, is less than or equal to 4. Other processes are similar to those shown in FIG. 13, and shall not be described any further.

Certain embodiments further provide a computer-readable program, wherein when the program is executed in a base station, the program enables the computer to carry out the method for allocating resources as described in embodiment 1 in the base station.

Certain embodiments further provide a storage medium in which a computer-readable program is stored, wherein the computer-readable program enables the computer to carry out the method for allocating resources as described in embodiment 1 in the base station.

Certain embodiments further provide a computer-readable program, wherein when the program is executed in a base station, the program enables the computer to carry out the method for transmitting CSI as described in embodiments 3 and 7 in the base station.

Certain embodiments further provide a storage medium in which a computer-readable program is stored, wherein the computer-readable program enables the computer to carry out the method for transmitting CSI as described in embodiment 3 and 7 in the base station.

Certain embodiments further provide a computer-readable program, wherein when the program is executed in UE, the program enables the computer to carry out the method for transmitting CSI as described in embodiment 4 or 7 in the user equipment.

Certain embodiments further provide a storage medium in which a computer-readable program is stored, wherein the computer-readable program enables the computer to carry out the transmission method for CSI as described in embodiment 4 or 7 in UE.

It can be seen from the above embodiment that the base station may allocate corresponding resources to the UE in accordance with the number of relevant downlink CCs, so, resource allocation is flexible, and the transmission of UCI containing aperiodic CSI in case of multiple carriers is supported, thereby ensuring the accuracy of receiving information by the base station, and reducing the limitation of the scheduling of the data transmission.

Certain embodiments of the aforementioned devices and methods may be implemented by hardware or by hardware in combination with software. Certain embodiments relate to such a computer-readable program that, when executed by a logical component part, enables the logical component part to implement the aforementioned devices or component parts, or enables the logical component part to realize the aforementioned methods or steps. Certain embodiments further relate to a storage medium for storing the program, such as a hard disk, a magnetic disk, an optical disk, a DVD, or a flash memory, and so on.

Certain embodiments are described above with reference to particular embodiments. However, it should be understood by those skilled in the art that such a description is illustrative only, and not intended to limit the protection scope of the invention. Various variants and modifications may be made by those skilled in the art according to the spirits and principle of certain embodiments, and such variants and modifications fall within the scope of the present invention.

What is claimed is:

1. A base station, comprising:
a control circuit configured to:
allocate corresponding resources to a user equipment according to a number of relevant downlink component carriers of which the user equipment should perform an aperiodic reporting of channel status information,
allocate maximum resources of a first number to the user equipment when the user equipment should perform the aperiodic reporting of channel status information of one downlink component carrier, and
allocate maximum resources of a second number to the user equipment when the user equipment should perform the aperiodic reporting of channel status information of more than one downlink component carrier; and
a transmitter configured to transmit downlink control information to the user equipment,
wherein the downlink control information further comprises an index of coding and modulation scheme, wherein resources are allocated to the user equipment by the base station according to the number of the relevant downlink component carriers, and wherein the user equipment is further configured to perform aperiodic transmission of channel status information according to triggering information, the index of coding and modulation scheme and used resources contained in the downlink control information.

2. The base station according to claim 1, wherein the first number is 4.

3. The base station according to claim 1, wherein the second number is greater than the first number, and the first number and the second number are determined according to a Channel Coding Rate (CCR).

4. A user equipment, comprising:
a receiver configured to receive downlink control information transmitted by a base station, the downlink control information comprising triggering information which indicates whether to perform an aperiodic reporting of channel status information of relevant downlink component carriers, and when indicated to perform the aperiodic reporting of channel status information of the relevant downlink component carriers, the downlink control information indicates an index and number of the relevant downlink component carriers,
wherein the maximum number of resources allocated by the base station to the user equipment is a first number if the user equipment should perform the aperiodic reporting of channel status information of one downlink component carrier; and the maximum number of the resources allocated by the base station to the user equipment is a second number if the user equipment should perform the aperiodic reporting of channel status information of more than one downlink component carrier;
a transmitter configured to aperiodically transmit the channel status information according to the triggering information,
wherein the downlink control information further comprises an index of coding and modulation scheme, wherein resources are allocated to the user equipment by the base station according to the number of the relevant downlink component carriers, and wherein the transmitter is configured to perform the aperiodic transmission of channel status information according to the triggering information, the index of coding and modulation scheme and used resources contained in the downlink control information.

5. The user equipment according to claim 4, wherein the first number is 4.

6. The user equipment according to claim 4, wherein the second number is greater than the first number, and the first number and the second number are determined according to a Channel Coding Rate (CCR).

7. A communication system, comprising:
a base station which includes a control circuit configured to allocate corresponding resources to a user equipment according to a number of relevant downlink component carriers of which the user equipment should perform an aperiodic reporting of channel status information; and
the user equipment which includes a receiver configured to receive downlink control information transmitted by the base station, the downlink control information comprising triggering information which indicates to the user equipment whether to perform the aperiodic reporting of channel status information of relevant downlink component carriers and when indicated to perform the aperiodic reporting of channel status information of the relevant downlink component carriers, the downlink control information indicates an index and number of the relevant downlink component carriers, and a transmitter configured to perform an aperiodic transmission of channel status information according to the triggering information; and
the control circuit of the base station is further configured to allocate
maximum resources of a first number to the user equipment if the user equipment should perform the aperiodic reporting of channel status information of one downlink component carrier, and
to allocate maximum resources of a second number to the user equipment if the user equipment should perform the aperiodic reporting of channel status information of more than one downlink component carriers,
wherein the downlink control information further comprises an index of coding and modulation scheme, wherein resources are allocated to the user equipment by the base station according to the number of the relevant downlink component carriers, and wherein the transmitter is further configured to perform the aperiodic transmission of channel status information according to the triggering information, the index of coding and modulation scheme and used resources contained in the downlink control information.

8. The system according to claim 7, wherein the first number is 4.

9. The system according to claim 7, wherein the second number is greater than the first number, and the first number and the second number are determined according to a Channel Coding Rate (CCR).

* * * * *